(12) United States Patent
Moysan et al.

(10) Patent No.: US 6,708,337 B2
(45) Date of Patent: Mar. 16, 2004

(54) DYNAMIC MULTIMEDIA STREAMING USING TIME-STAMPED REMOTE INSTRUCTIONS

(75) Inventors: Erwan Moysan, Chatou (FR); Louis John Gurtowski, San Jose, CA (US)

(73) Assignee: QEDSoft, Inc., San Francisco, CA (US)

( * ) Notice: Subject to any disclaimer, the term of this patent is extended or adjusted under 35 U.S.C. 154(b) by 0 days.

(21) Appl. No.: 09/968,457

(22) Filed: Oct. 1, 2001

(65) Prior Publication Data

US 2002/0167956 A1 Nov. 14, 2002

Related U.S. Application Data

(60) Provisional application No. 60/276,652, filed on Mar. 16, 2001.

(51) Int. Cl.[7] .............................................. H04N 7/173
(52) U.S. Cl. ....................................................... 725/95
(58) Field of Search ........................ 348/14.12, 14.13; 725/95, 101, 93, 87, 89, 116; 375/240; 370/229, 468, 465, 234

(56) References Cited

U.S. PATENT DOCUMENTS

| | | | | |
|---|---|---|---|---|
| 5,604,742 A | * | 2/1997 | Colmant et al. ............ 370/396 |
| 5,940,148 A | * | 8/1999 | Joseph et al. .......... 375/240.26 |
| 6,014,694 A | * | 1/2000 | Aharoni et al. ............. 709/219 |
| 6,181,711 B1 | * | 1/2001 | Zhang et al. ................ 370/468 |
| 6,185,736 B1 | * | 2/2001 | Ueno ........................... 725/95 |
| 6,266,346 B1 | * | 7/2001 | Takeda et al. .............. 370/468 |
| 6,275,471 B1 | * | 8/2001 | Bushmitch et al. ......... 370/248 |
| 6,370,688 B1 | * | 4/2002 | Hejna, Jr. ................... 725/101 |

OTHER PUBLICATIONS

U.S. patent application Ser. No. 10/022,081, Liou et al., filed Dec. 13, 2001.

* cited by examiner

Primary Examiner—Chris Kelley
Assistant Examiner—Behrooz Senfi
(74) Attorney, Agent, or Firm—Bingham McCutchen LLP; David G. Beck

(57) ABSTRACT

Methods and devices, using time stamped remote instructions, procedures and data are presented for the efficient streaming of multimedia data and instructions. These methods are particularly suited for low latency streaming of a plurality of multimedia data types and can work in conjunction with industry standards such as MP3, JPEG and MPEG. These methods are also suited for flexible and dynamic streaming that can take into account different bandwidths and transmission times between a server and a clients' machines.

4 Claims, 9 Drawing Sheets

DYNAMIC MULTIMEDIA STREAMING USING TIME-STAMPED REMOTE INSTRUCTIONS

CROSS-REFERENCES TO RELATED APPLICATIONS

This application claims priority from U.S. Provisional Application No. 60/276,652, filed Mar. 16, 2001, which is incorporated herein by reference for all purposes.

BACKGROUND OF THE INVENTION

The present invention relates generally to the field of transmitting data over networks and particularly relates to streaming media technology.

Transmitting audio, video and combined data over networks, including the Internet, has become a routine aspect of modern life. In a typical scenario, a user downloads an application program (such as "player" software) to a hard drive on a personal computer, then downloads an entire data file (such as an audio or video file), then plays the file. Although user only needs to download the player once, the user must fully download each audio or video file before it can be played.

Due to the advent of "streaming media" or "multimedia streaming" technology, users no longer need to download an entire data file before playing it. Instead, an on-line content provider transmits discrete packets of data, which are normally compressed, in a continuous sequence or "stream." If a user has already downloaded or otherwise installed an application program, the user may play each packet as soon as the packet is received and decompressed.

Although prior art streaming media technology represents a significant advancement over the prior art, a user will often experience significant delays if all data are not in the same type of industry-standard format or if the entire application or player program is large or not installed in the user's machine. If these delays are significant, a user will not be satisfied with the resulting slow response. The user may decide not to use the associated software. With regard to use at an Internet web site, if delays are significant the user may simply browse another web site, which could mean lost revenue for the web site owner.

It would be of great benefit if users could download and play streams of packets which include multiple data types and those which require large application programs to play back, while keeping the initial latency before displaying the multimedia data to the screen to a minimum.

It would be of significant value if raw timed multimedia data could be quickly encoded into such a scheme because such multimedia data are a natural output format of multimedia design tools. Additionally, it would be of great value if the streamed packets could be dynamically encoded for different bandwidths and transmission times.

SUMMARY OF THE INVENTION

The present invention includes various methods and devices for implementing compression, streaming, and decompression of multimedia data packets between a client and a server program. These methods can encode directly and very efficiently from raw timed multimedia data. The playback offers both very low initial latency and unlimited playback length because of the unique way data and instructions are merged together.

In some embodiments, a time code or "time stamp," multimedia data and instructions are included in a single data packet which is part of a stream of data packets. The time stamp may indicate a time at which a data packet shall be transmitted or a time at which corresponding instructions shall be executed.

In this disclosure, an instruction may be termed a procedure call, a remote procedure call (an "RPC"), a function call, or may have other names. Such instructions typically include one or more commands relating to the reproduction of multimedia data. In many embodiments of the present invention, the instructions are used by "player" software installed on a client computer to perform operations on the multimedia data.

In some embodiments, the data packets also include parameters of the associated data. In still other embodiments, a data packet will include instructions and a reference to data which are not included within the same data packet. Such data may reside on a computer which receives the data packet.

In some embodiments, some data packets will not have time stamps, but will be associated with other data packets which have time stamps. In some such embodiments, the instructions in a data packet with no time stamp will be executed at approximately the same time at which instructions in an associated data packet which has a time stamp will be executed. In other embodiments, the instructions in a data packet with no time stamp will be executed before or after the time at which instructions in an associated data packet which has a time stamp will be executed.

According to the present invention, multimedia data are organized into compressed data packets. A set of encoding routines transforms a set of instructions and multimedia data into a set of time-stamped procedure calls which are transferred with corresponding portions of the multimedia data upon which the instructions will operate. In some embodiments, data parameters are also included in the data packets. Each procedure call is later converted to an RPC: the parameters are organized into data packets and all data needed for the RPC are time-stamped and stored. All RPC's are stored in sequence, sorted by time stamp. In some embodiments, the encoding process compresses the stored data. In some embodiments, the resulting data packets are compressed again, e.g., by using a lossless dictionary compression method.

The process of organizing data into packets may be referred to in this application as "marshaling." This term is not limited to its common meaning in the art, but includes any convenient way of organizing data into data packets according to the present invention.

A method according to one embodiment of the present invention includes the steps of: (1) determining a transmission time, based transmission data which include information regarding a speed of a transmission medium, for a plurality of multimedia data which correspond to a plurality of instructions; (2) assigning time stamps to at least a portion of the instructions, the time stamps corresponding to the determined transmission times; and (3) arranging the time stamps, the instructions and the multimedia data into a sequence of data packets for controlling a player to reproduce the multimedia data.

A device according to an embodiment of the present invention includes: (1) an apparatus for determining a transmission time, based upon transmission data which include information regarding a speed of a transmission medium, for a plurality of multimedia data which correspond to a plurality of instructions; (2) an apparatus for assigning time stamps to at least a portion of the instructions, the time stamps corresponding to the determined transmission times; and (3) an apparatus for arranging the time stamps, the instructions and the multimedia data into a sequence of data packets.

Another method according to the present invention includes the steps of: (1) receiving data packets; (2) de-marshalling the data packets into time stamps, instructions and multimedia data; (3) determining an execution time, based upon the time stamps, for each of the instructions; and (4) executing the instructions, thereby reproducing the multimedia data.

Yet another method according to the present invention includes the following steps: (1) receiving a data packet; (2) de-marshalling the data packet into a time stamp, an instruction and a data code which corresponds to data stored in memory accessible to the local computer; (3) determining an execution time, based upon the time stamps, for the instruction; (4) retrieving the data which corresponds to the data code; and (5) executing the instruction, thereby reproducing the data which corresponds to the data code.

Some methods according to the present invention involve the asynchronous storage and retrieval of time-stamped data packets. In some such embodiments, time stamps, instructions and multimedia data are stored in a first device at a first time and are requested by a second device at a second time.

An apparatus according to another embodiment of the present invention includes: (1) an apparatus for receiving data packets; (2) an apparatus for de-marshalling the data packets into time stamps, instructions and multimedia data; (3) an apparatus for determining an execution time, based upon the time stamps, for each of the instructions; and (4) an apparatus for executing the instructions, thereby reproducing the multimedia data.

An apparatus according to still another embodiment of the present invention includes: (1) an apparatus for receiving a data packet; (2) an apparatus for de-marshalling the data packet into a time stamp, an instruction and a data code which corresponds to data stored in memory accessible to the local computer; (3) an apparatus for determining an execution time, based upon the time stamps, for the instruction; (4) an apparatus for retrieving the data which corresponds to the data code; and (5) an apparatus for executing the instruction, thereby reproducing the data which corresponds to the data code.

A data packet for controlling a computer to reproduce multimedia data according to some embodiments of the present invention includes: (1) a data code which corresponds to data stored in memory accessible to a computer which receives the data packet; (2) an instruction to player software stored on the computer regarding reproduction of the data; and (3) a time code indicating when the instruction will be performed.

A data packet for controlling a computer to reproduce multimedia data according to other embodiments of the present invention includes: (1) multimedia data; (2) an instruction to player software stored on the computer regarding reproduction of the multimedia data; and (3) a time code indicating when the instruction will be performed.

DESCRIPTION OF THE SPECIFIC EMBODIMENTS

Figure 1:
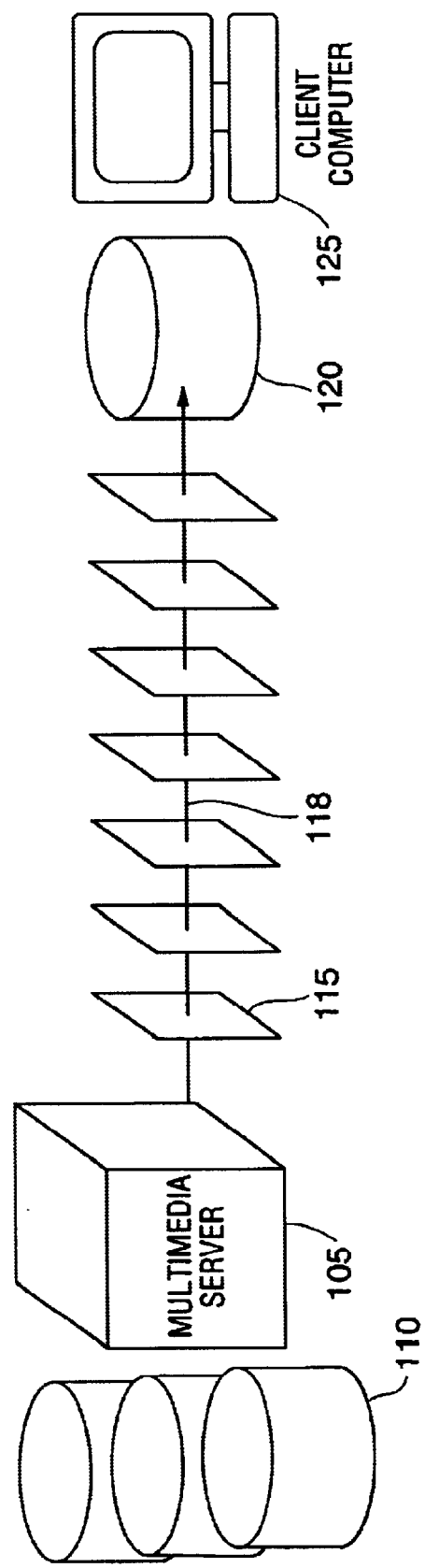
FIG. 1 illustrates the prior art concept of streaming data packets.

FIG. 1 illustrates a simplified prior art model of multimedia streaming. Multimedia server 105 includes buffer 110 for temporarily storing data packets 115, which are transmitted over network 118 to buffer 120 of client terminal 125. Data packets 115 are often sent in a compressed format (for example, JPEG, MPEG, AVI, ASF, ATRAC, ATRAC2 or REAL) and then decompressed at client terminal 125. Data packets 115 are normally played as soon as they are decompressed on an application program which has previously been stored in client terminal 125.

Figure 2:
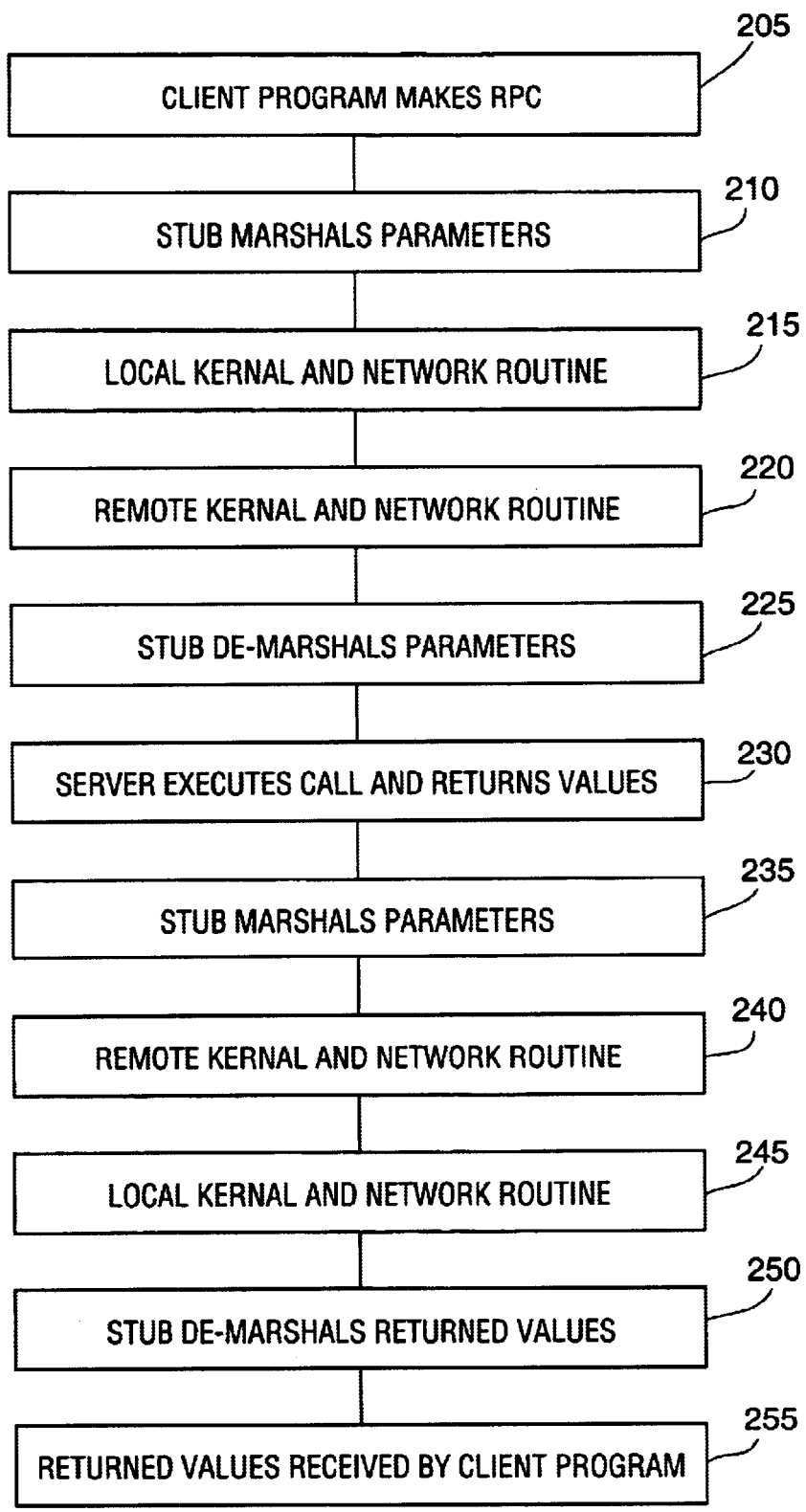
FIG. 2 is a flow chart which depicts a prior art Remote Procedure Call ("RPC") architecture across a client-server model.

FIG. 2 illustrates prior art RPC architecture across a client-server model. In step 205, an application program running on a client computer makes an RPC. In step 210, a stub function associated with the client computer marshals the parameters of the RPC into a data packet. For example, the stub function may pack function arguments into a flat representation. In step 215, the data packet is sent across a network and in step 220, and the data packet is received by a remote server. In step 225, a stub function associated with the remote server de-marshals the parameters and sends the de-marshaled data packet to an application running on the remote server.

In step 230, the application on the remote server executes the call and returns values to the stub function on the remote server, where the returned values are marshaled into a returned data packet in step 235. In step 240, the returned data packet is sent across the network and in step 245, the returned data packet is received by the client computer. In step 250, the stub function associated with the client computer de-marshals the returned data packet and in step 255, the returned values are received by the application program running on the client computer.

According to some embodiments of the present invention, a sequence of time raw multimedia data specified as input file format are input to an encoder which often resides on a networked computer, e.g., a server. The encoder transforms this file format into a sequence of procedures with the parameters/data for each of the procedures. The procedures are intended to be executed on one or more computers, which have the necessary software, including "player" software, to run the procedures. In some preferred embodiments, the procedures are run asynchronously with respect to the server. For convenience, the computers which run the procedures may be referred to as "client computers." The software may include part of the operating system of the client computer, or may include an extension of the operating system of the client computer.

In one embodiment, the encoder is provided with information regarding the transmission speed or bandwidth of a communications line between the client computer and the server. The encoder organizes procedure calls in a time line. The encoder then puts appropriate time stamps on each procedure call. Using the timeline and the known bandwidth/transmission speed of the communications line, the encoder determines the appropriate transmission times for the data and parameters needed for each procedure call.

Depending on the complexity of the scene or sequence, several types of data (such as audio, 2D, 3D and video) may need to be transmitted. By taking into consideration the number data elements and the number of bytes of each data element, the encoder calculates the time needed for transmission of the multimedia sequence over a known-bandwidth line. In this way, the encoder can integrate the proper data types and procedures in the proper portion of the data stream, so that the scene can be displayed as intended.

Figure 3:
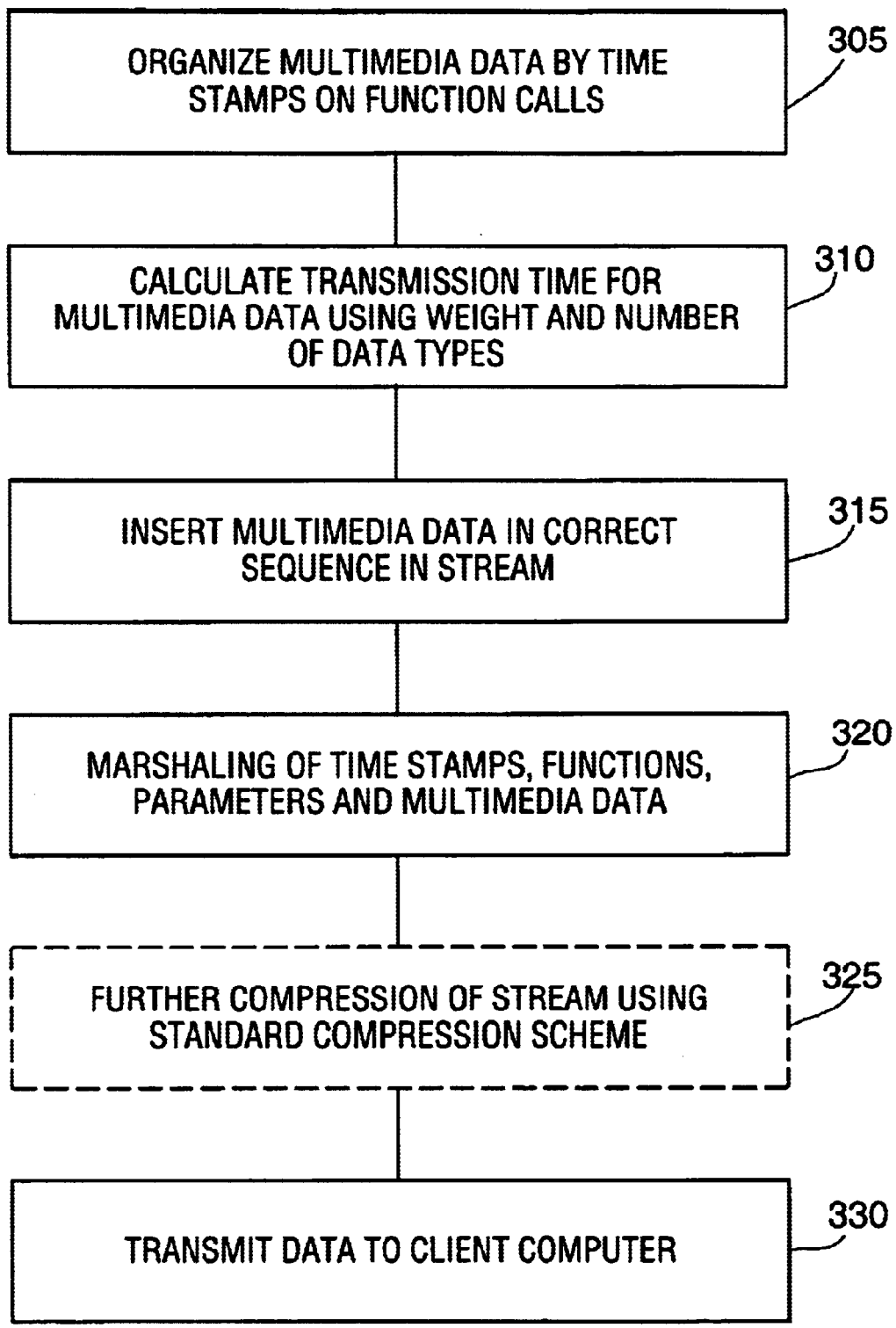
FIG. 3 is a flow chart which depicts an encoding process according to an embodiment of the present invention.

The encoding process according to one embodiment of the present invention is illustrated in FIG. 3. In many instances, the input data are in the form of raw multimedia data output from a multimedia design tool such as FilmBox™ or 3DSMAX™. For example, such raw multimedia data could specify a sequence of times and a corresponding sequence of geometric data used to specify the shapes of 3-D objects. Initially the raw multimedia data are transformed into function calls.

In one example of the process underlying the transformation of raw multimedia data into function calls, the input data associate a time (e.g., t=1) with a particular set of polygons which depict a 3-D object. Such data may be in a variety of data formats, e.g., ASCII format. Thus, for example, the raw input date may be transformed into the function call "DISPLAY POLYGONS," a pre-established protocol recognized by the server and by software on the client computer.

In step 305, the encoder encodes a time stamp with each function call (procedure call). In step 310, a transmission time is calculated for multimedia data associated with the function call. In some embodiments, the transmission time is encoded as part of the time stamp. In some preferred embodiments, the calculation is based not only on the bandwidth of the communication line between the encoder and the client computer, but is also based on the weight of each type of data and the number of data types. In some preferred embodiments, the calculation includes a correction for real versus theoretical bandwidth. For example, if the encoder has been specified a theoretical bandwidth of 56K bits=56,000 bits/sec) and a JPEG compressed image made of 14K bytes, the encoder will calculate the transmission time as 14K bytes×8 bits/byte÷56,000 bits/second=2 seconds. Therefore, in some embodiments the transmission time is calculated and encoded as 2 seconds. However, statistics show that the actual bandwidth for a 56K connection is around 70% of its theoretical value. Therefore, in some preferred embodiments, a 'real' bandwidth for a 56K connection is calculated as follows: 56Kbits/s*70%=39,200 bits/s. 14K bytes×8 bits/byte÷39,200 bits/s results in a calculated 'real' transmission time of 2.86 seconds.

The delta or difference between the theoretical and actual bandwidth can be obtained from statistical tables or may be measured. For example, some publications have documented statistical data which has been collected over an extended period of time and use one or more of the following input variables:

1) Type of connection (56K, DSL, T1, cable);
2) Intra-net or internet connection;
3) ISP provider; and
4) Country, region and other germane information.

One such compilation reported the following ranges of actual download speeds for various types of communications technology:

TABLE 1

| Technology | Download Speed |
| --- | --- |
| ASDL | 1.5 to 8.2 Mbps |
| E-1 | 2.0 Mbps |
| E-3 | 34.4 Mbps |
| Fractional T-1 | 128 Kbps to 1.5 Mbps |
| Fractional T-3 | 3 Mbps to 44.7 Mbps |
| Frame Relay | 56 Kbps to 1.5 Mbps |
| OC-3 | 155.5 Mbps |
| OC-12 | 622.1 Mbps |
| OC-48 | 2.5 Gbps |
| SDSL | 1.5 to 2.0 Mbps |
| T-1 | 1.5 Mbps |
| T-3 | 44.7 Mbps |

According to some embodiments of the present invention, the values reported in Table 1 are used to calculate the transmission time. According to some such embodiments, when a range of values is reported in Table 1, the average value is used. In other embodiments, the reported results of other publications are used. When available, publications are used which report statistics regarding communication technology which most closely matches that of the client computer's connection. The foregoing input variables are used in order to determine the closest match.

According to other embodiments of the present invention, the download speed of a client's communication link has been measured and tabulated, and these measurements are used to calculate the transmission time. In some such embodiments, service providers monitor a client's actual download speeds over a period of time and generate reports indicating average performance, cyclical fluctuations, etc. Some embodiments of the present invention use the average measured download speed to calculate transmission time.

In still other embodiments of the present invention, the transmission time is dynamically adjusted according to the current download speed of data being delivered to a client computer. In some such embodiments, when data packets stored on a server or an associated storage device are in the process of being downloaded, the server monitors the actual download speed and makes adjustments to the encoded transmission times based on the measured download speed.

For example, in some embodiments, transmission times for a 56K connection are calculated assuming an actual speed of 39,200 bits/s and the data packets are encoded with transmission times corresponding to this assumption. If the server determined that the data were being downloaded at only half of this speed (19,600 bits/s) during a certain period of time, the server would multiply the encoded transmission times by 2 during that period of time. If the actual downloading speed changed, the server would compute and apply a corresponding correction to the encoded transmission times.

In some such embodiments, no corrections are made to the encoded correction times until the actual downloading speed varies from the assumed speed by more than a predetermined percentage. Similarly, if a server has been dynamically adjusting the encoded transmission times according to the actual download speed of data being delivered to a client computer, in some embodiments the same adjustment is made until the actual download speed has changed by more than a certain percent. In some such embodiments, the same adjustment is made until the actual download speed has changed by more than a certain percent and the change has persisted during a predetermined time interval.

In step 315, multimedia data are inserted in an appropriate sequence in a stream of data. In step 320, the time stamps, functions, multimedia data and parameters of the multimedia data are marshaled into one or more data packets. As will be described below, the efficient organization of data and functions provided by the present invention effectively compresses the data packets as compared to the number of bytes needed for encoding this information using prior art methods. In optional step 325, the data packets are further compressed using a known compression scheme. In step 330, the data packets are transmitted to a client computer at appropriate time intervals.

As noted above, the procedure calls are encoded according to a pre-established protocol, which is recognized by the server and by software on the client computer. For example, in one embodiment 0001 means "call display text procedure" and 0002 means "call saved text data."

Various methods of organizing data into data packets are within the scope of the present invention. In some embodiments, the format is as follows:

Txxx Pxxx N, S1, S2, . . . SN, P2, P2, . . . PN, where

Txxx is a time stamp specifying when to start the procedure call;

Pxxx is a procedure number to call according to a predefined protocol;

N is the number of parameters;

S1, S2, . . . SN are the sizes of parameters 1 through N; and

P1, P2, . . . PN are the parameters of the procedure call.

In some embodiments of the present invention, an encoding format allocates 4–16 bits for the time stamp and 4–8 bits for the procedure numbers. However, the foregoing encoding formats are purely exemplary and the number of bits allocated to the time stamp and procedure numbers could be outside the stated ranges. Similarly, in some embodiments a second is divided in 150 ticks, but any convenient time division may be used.

Figure 4:
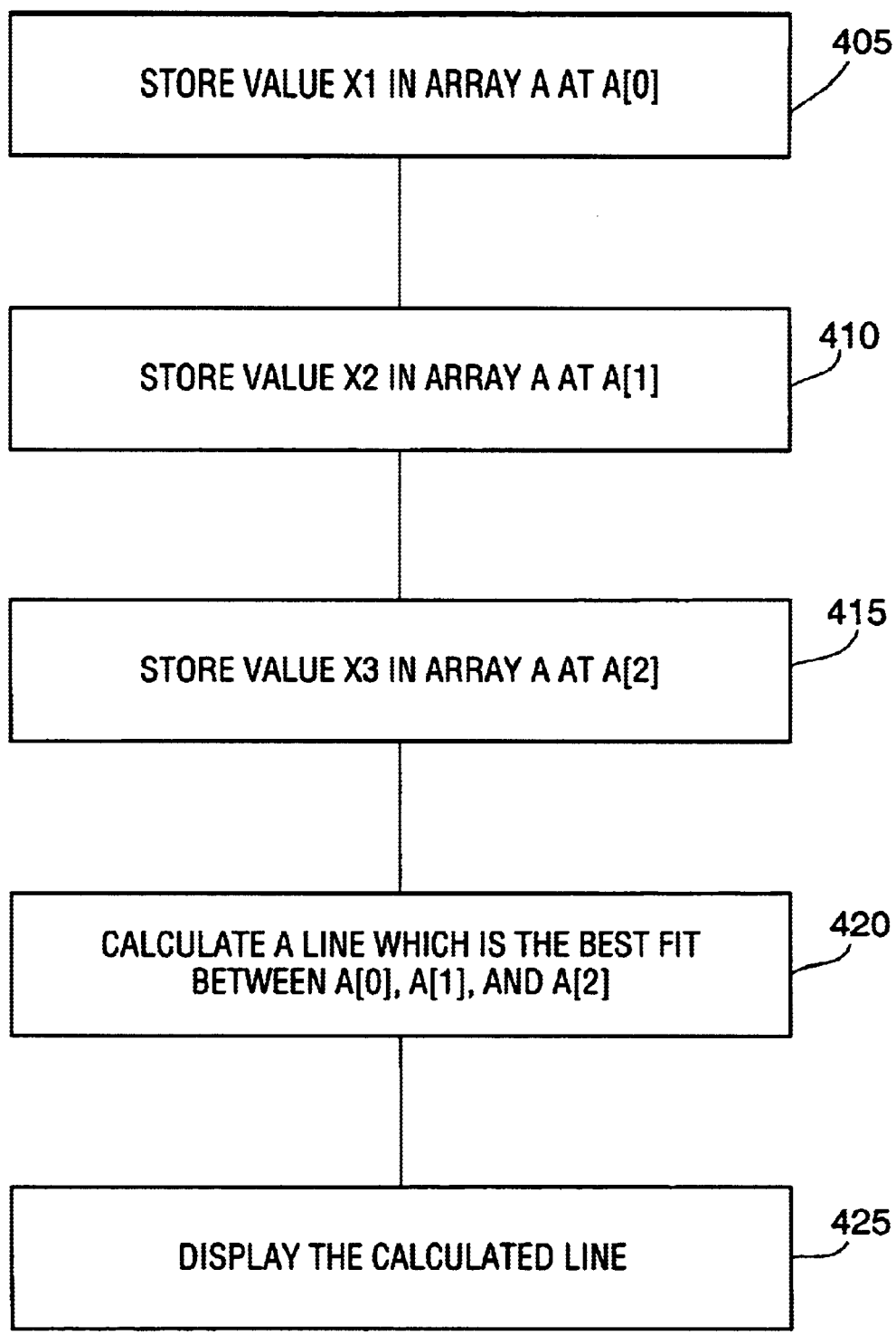
FIG. 4 is a flow chart which depicts a decoding process according to an embodiment of the present invention.

FIG. 4 illustrates a generalized decoding process according to one embodiment of the present invention. In decoding process 400, client computer receives a data packet in step 405. In optional step 410, a client computer decompresses the data packet according to a standard decompression algorithm. In step 415, the client computer unpacks the time stamps, functions, parameters and multimedia data contained in the data packet. In optional step 418, multimedia data which are in a compressed format (such as JPEG, MPEG, AVI, ASF, ATRAC, ATRACT on REAL) are decompressed. In step 420, the unpacked functions are executed at times corresponding to the unpacked time stamps.

In some embodiments, the client computer will compare the time of the time stamp with the time of a client clock associated with the client computer. If the time indicated by the time stamp is greater than or equal to the computer time, the procedure will be called. In some embodiments, the client clock or the client computer includes a time management system for adjusting the time of the client clock. In some such embodiments, the time management system includes procedures such as InitialSystemClock or ResetSystemClock, which can be called from C or C++.

However, the encoder may use a simpler format for the encoded data packets. In one embodiment, only a time stamp, a procedure number and one or more parameters are encoded in the data packets in encoding process 300. One example of such a data packet is as follows:

| 0001 | 0020 | "Hello World" |
|---|---|---|

According to this data packet, at time 0001, procedure 0020 is called. In this case, procedure 0020 is a procedure whereby a player displays a text message according to associated parameters. Upon receiving this data packet, the player would display the text message "Hello World."

According to some embodiments of the present invention, the encoder efficiently formats data packets for rendering graphics. Following is a simplified example of such encoding:

| 0002 | 0021 | X1 | A |
|---|---|---|---|
| 0003 | 0021 | X2 | A + 1 |
| 0004 | 0021 | X3 | A + 2 |
| 0010 | 0122 | A | 3 |

Figure 5:
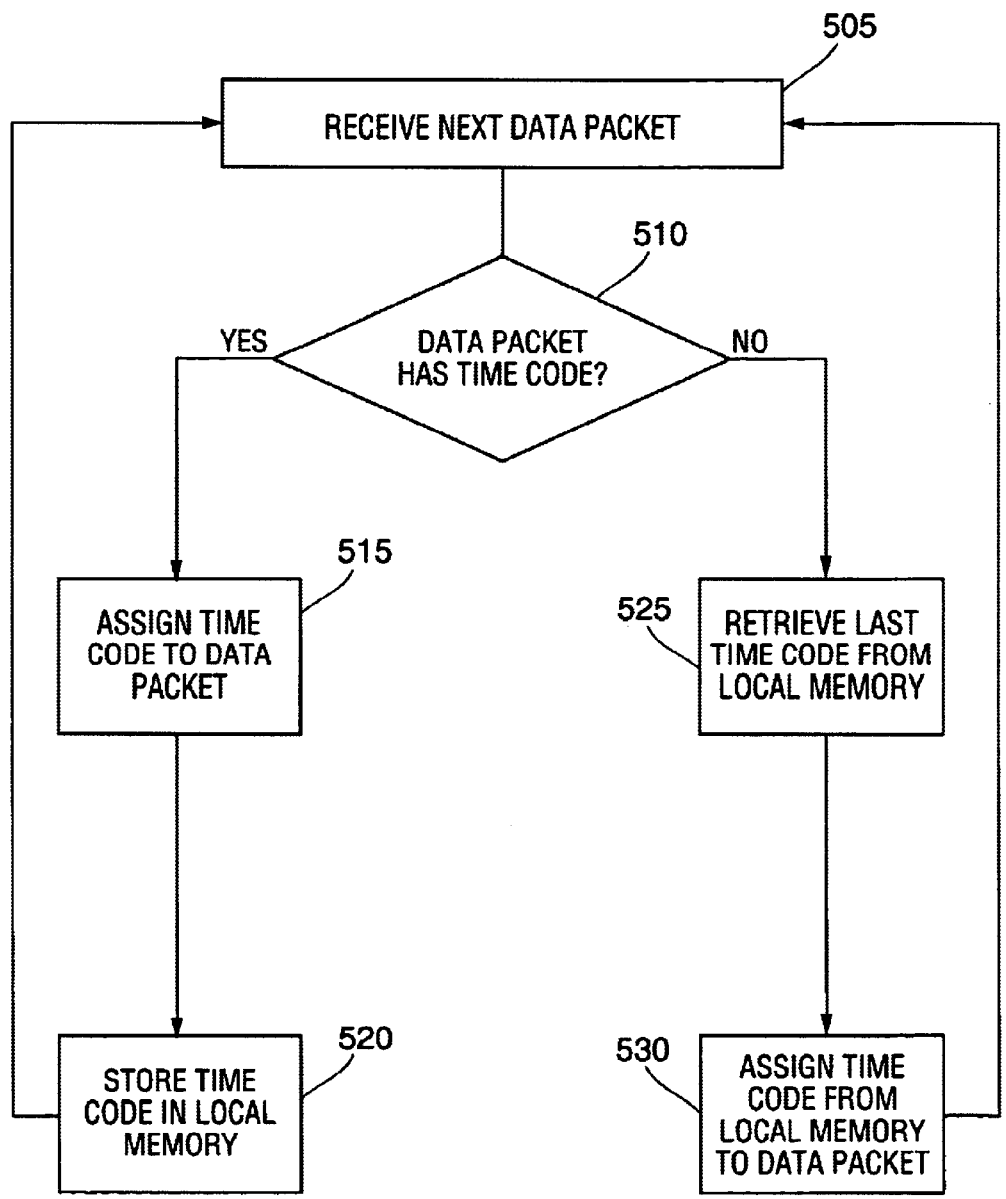
FIG. 5 is a flow chart which depicts a process of displaying efficiently encoded graphic information according to an embodiment of the present invention.

The process of decoding these packets will be explained in greater detail with reference to FIG. 5. In step 505 (time 0002), procedure 0021 is called, which causes value X1 to be stored in array A at A[0]. In step 510 (time 0003), procedure 0021 is called, which causes value X2 to be stored in array A at A[1]. In step 515 (time 0004), procedure 0021 is called, which causes value X3 to be stored in array A at A[2]. In steps 520 and 525 (at time 0010), procedure 0122 is called, which causes a best fit to be calculated between the three stored points and causes the results to be displayed. In one embodiment, the foregoing steps are performed by player software, which resides on a client computer.

In the foregoing example, only a small number of bytes are needed to obtain a display of a best fit between 3 points at a local player time of 0010. By increasing the number of data points, a progressively better approximation of a non-linear curve may be obtained.

In some embodiments of the present invention, at least some of the data to be operated on according to a procedure call are not transmitted in the same data packet as the procedure call. In some such embodiments, data are stored in a memory associated with a client terminal prior to the time at which the data packet which includes the procedure call has been transmitted. In one embodiment, data previously stored in a client terminal are identified by a code in the data packet which contains the procedure call. For example, the data packet may be in the following format:

| 0044 | 0115 | 04 |
|---|---|---|

In one embodiment, this data packet indicates that at time 0044, procedure 0115 shall be performed upon locally-stored data which are identified by code 04.

In some embodiments, the previously-stored data are downloaded to the client computer. Following is an example of a format of coded data packets for achieving such an embodiment:

| 0002 | 08 | A | JPEG DATA |
|------|----|----|-----------|
| 0012 | 20 | A | |

At time 0002, procedure call 08 causes JPEG data to be stored in area A of a local storage medium. In one embodiment, the local storage medium is a solid state memory device. At time 0012, procedure call 20 causes the JPEG data stored in area A to be displayed.

A sequence of time-stamped remote procedure calls is not merely a compressed program. Instead, a sequence of time-stamped remote procedure calls includes implicit lag times which are needed for the transmission of data. In the preceding example, the JPEG data may have taken X seconds to transmit using a 56K modem. Therefore, the display of the data must take into account the transmission time of the JPEG image. The time stamps encoded in each data packet take this transmission time into account.

It should be noted that some embodiments of the present invention can be thought as a wrapping layer around multimedia data and that nothing prevents that multimedia data to be compressed, e.g., in an industry standard data compression format such as JPEG, MPEG, AVI, ASF, ATRAC, ATRAC2 or REAL. The corresponding decoding stage of such embodiments simply calls the appropriate routine to display the multimedia data. This process could be as simple, such as "DRAWCIRCLE with center at X and radius of Y." Alternatively, the decoding process could be include much more sophisticated steps, e.g., a command to decompress and play a specified MPEG sequence.

Figure 6:
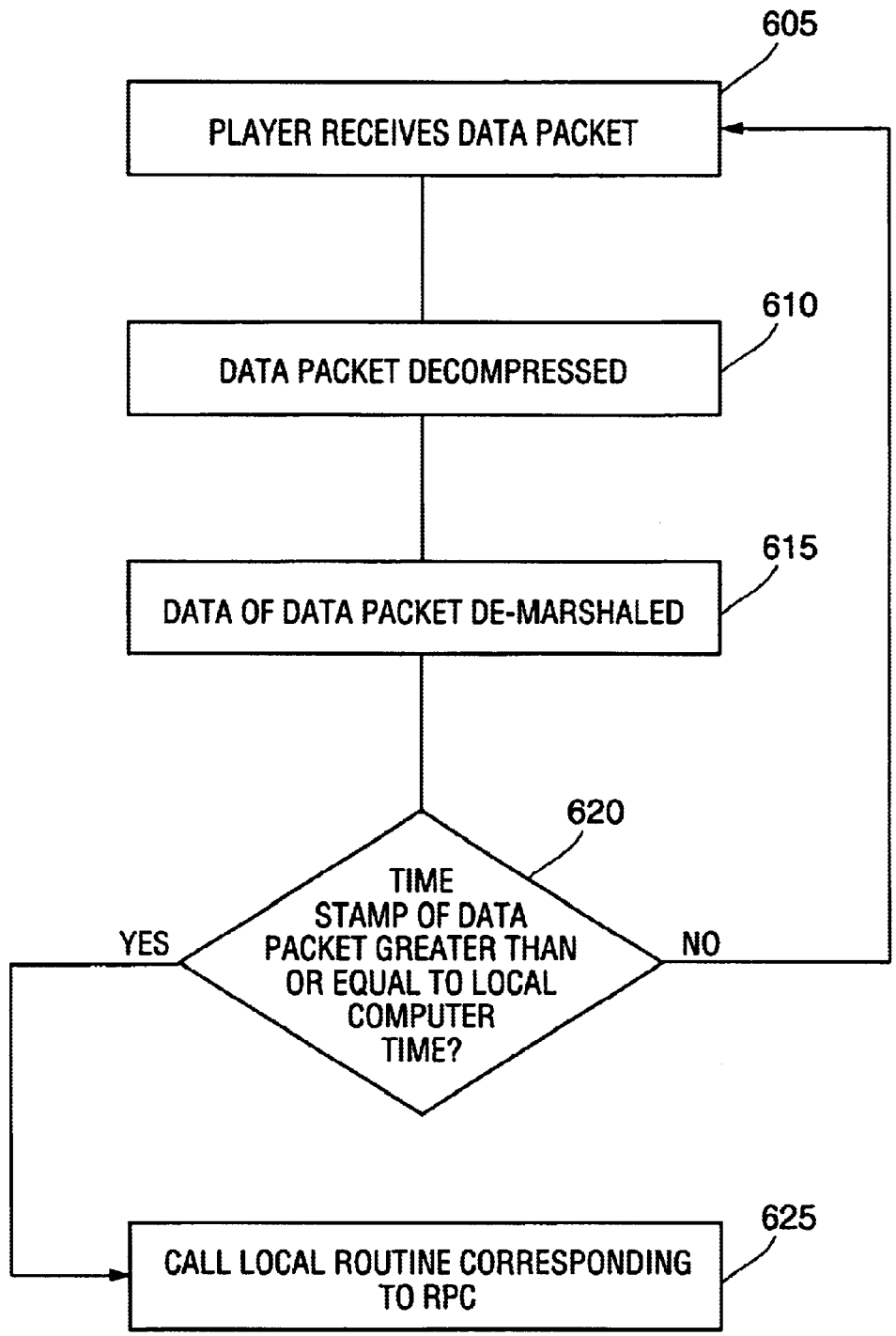
FIG. 6 is a flow chart which depicts a procedure followed by a client computer after receiving efficiently encoded graphic information according to an embodiment of the present invention.

Some embodiments of the present invention use a single time code for multiple data packets. Such data packets may be more efficiently encoded if a packet containing a time code is followed by a series of packets with no time code. The client computer assigns packets with no time code the time code of the last data packet containing a time code. Referring to FIG. 6, in step 605 the client computer receives a first data packet. In step 610, the client computer determines whether the first data packet includes a time code. In this example, the client computer determines that the first data packet includes a time code and that time code is assigned to the first data packet in step 615. In step 620, the time code of the first data packet is stored in local memory.

The procedure then returns to step 605, wherein the client computer receives a second data packet. In step 610, the client computer determines whether the second data packet includes a time code. In this example, the client computer determines that the second data packet does not include a time code. Therefore, the process continues to step 625, wherein the last time code received (in this case, the time code of the first data packet) is retrieved from local memory. In step 630, the time code of the first data packet is assigned to the second data packet.

The procedure then returns to step 605, wherein the client computer receives a third data packet. In step 610, the client computer determines whether the third data packet includes a time code. In this example, the client computer determines that the third data packet does not include a time code. Therefore, the process continues to step 625, wherein the last time code received (in this case, the time code of the first data packet) is retrieved from local memory. In step 630, the time code of the first data packet is assigned to the third data packet.

The procedure then returns to step 605, wherein the client computer receives a fourth data packet. In step 610, the client computer determines whether the fourth data packet includes a time code. In this example, the client computer determines that the fourth data packet includes a time code and that time code is assigned to the fourth data packet in step 615. In step 620, the time code of the fourth data packet is stored in local memory.

In some embodiments, the procedure calls of data packets with no time stamps are executed at the same time as the procedure call of the last time-stamped data packet. In other embodiments, the procedure calls of data packets with no time stamps are executed in sequence after the procedure call of the last time-stamped data packet. Some embodiments include a code in at least one data packet which indicates whether the procedure calls of data packets with no time stamps will be executed at the same time as the procedure call of the last time-stamped data packet or in sequence after the procedure call of the last time-stamped data packet. This code may be a separate code or may be indicated by the code for one or more procedure calls. For example, in one embodiment, the procedure call of the last time-stamped data packet indicates that the following data packets without time stamps will be executed simultaneously.

Although no ending step is indicated in FIG. 6, there are various scenarios which can cause the routine to end. In one embodiment, the routine ends if a data packet is not received within a certain period of time. In another embodiment, the routine awaits an additional data packet at step 605 until the local computer is turned off.

Because many parameters of successive data packets will be the same, a high level of data compression may often be achieved. Data entropy is often low, particularly if the transmitted data include a significant amount of common background material between successive multimedia frames. For example, if video data in successive data packets include relatively slow-moving natural scenes, most of the data in one video frame will be the same as the data in the next video frame. Moreover, there will often be a high correlation between the procedure calls of consecutive data packets.

Figure 7:
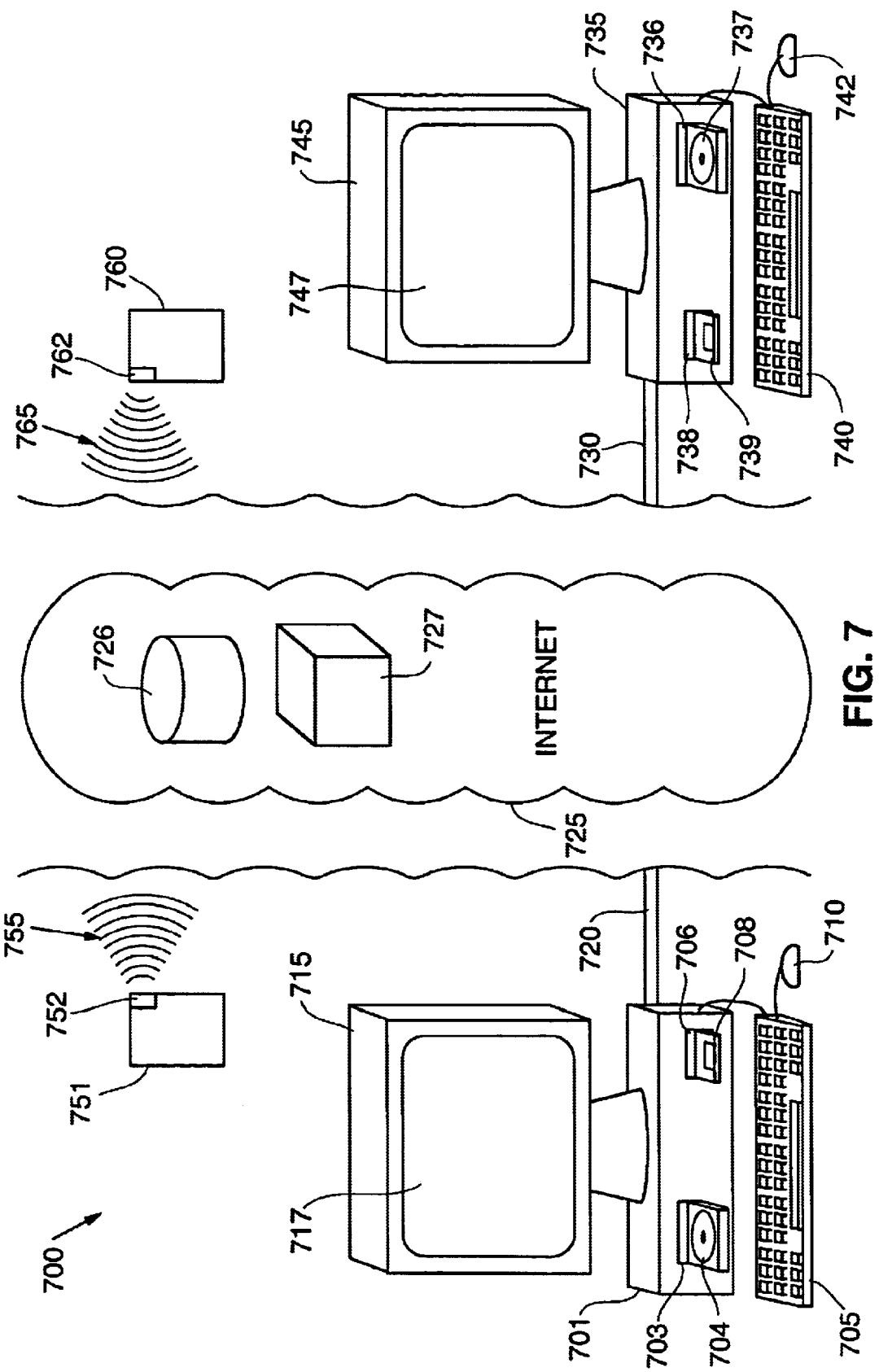
FIG. 7 depicts an apparatus according to some embodiments of the present invention.

FIG. 7 is a schematic depiction of system 700. Computer 701 is a server in some embodiments of the present invention. Computer 701 includes optical disk drive 703 and floppy disk drive 706, in which removable optical disk 704 and removable floppy disk 708, respectively, are currently disposed. A person may interact with computer 701 in a variety of ways, including interaction via keyboard 705 and mouse 710. Display device 715 displays information, graphical user interfaces, etc. In some embodiments, a person may interact directly with display device 715, for example by touching screen 717.

Computer 701 also includes hard drive 718 and processor 719 (not shown), as well as all necessary hardware and software for connecting, through data channel 720, with Internet 725. In some embodiments, encoding software 721, which forms data packets according to the present invention, resides on hard drive 718. Multimedia data may be stored on any of the storage media associated with computer 701.

Service provider database 726 and service provider computer 727 are schematically shown as part of Internet 725. In some embodiments of the present invention, multimedia data reside in service provider database and encoding software reside in a medium accessible by service provider computer 727.

Data channel 730 connects computer 735 with Internet 725. In some embodiments of the present invention, computer 735 is a local or client computer. Computer 735 includes optical disk drive 736 and floppy disk drive 738, in which removable optical disk 737 and removable floppy disk 739, respectively, are currently disposed. A person may interact with computer 735 in a variety of ways, including interaction via keyboard 740 and mouse 742. Display device 745 displays information, graphical user interfaces, etc. In some embodiments, a person may interact directly with display device 745, for example by touching screen 747.

Computer 735 also includes hard drive 750 and processor 755 (not shown), as well as all necessary hardware and software for connecting, through data channel 730, with Internet 725. Multimedia data and player software for use according to the present invention may reside in any convenient location, including optical medium 704, floppy disk 708, hard drive 718, service provider database 726, service provider computer 727, optical medium 737, floppy disk 739, hard drive 750, storage device 753 or storage device 763.

Data may also be transmitted and received by handheld devices 751 and 760. Handheld device 751 includes modem 752, storage device 753 (not shown) and all necessary software for making wireless communications 755 with Internet 725. Similarly, handheld device 760 includes modem 762, storage device 763 (not shown) and all necessary software for making wireless communications 765 with Internet 725. In one embodiment, at least one of handheld devices 751 and 760 is a personal digital assistant or PDA. In another embodiment, at least one of handheld devices 751 and 760 is a handheld personal computer or HPC. In another embodiment, at least one of handheld devices 751 and 760 is a palmtop device. Handheld devices 751 and 760 are better suited for use as local computers on which multimedia data are reproduced than as devices for encoding data packets according to the present invention. It should be also noted that the present invention minimizes the amount of data to be stored for long periods by emphasizing constant streaming of data, thus reducing the total amount of storage needed. This is obviously of great value for handheld devices 751 and 760, because such devices typically have less available storage capacity than larger devices.

For use on the Internet, data packets formed by the encoder of the present invention may be reproduced by player software. Such player software may be downloaded by a user and installed on a client computer. In one embodiment, the player is a "plug-in" which is downloaded by a browser installed on the client computer. The player understands the structure of the data stream and is programmed to connect remote procedure calls to system calls on the local machine.

In some embodiments, the architecture of the player includes a decode function and an event function. The decode function obtains the data stream (normally from a buffer) byte by byte. The decode function decompresses each data packet and creates events from the data packets which can run asynchronously on the player. If necessary, the player decompresses those portions of the data stream which have arrived in the local machine. Then, the player proceeds in sequence through every remote procedure call, comparing its time to the local computer's time. If the system time is greater than or equal to the time stamp on the remote procedure call, the local computer executes the remote procedure call.

Figure 8:
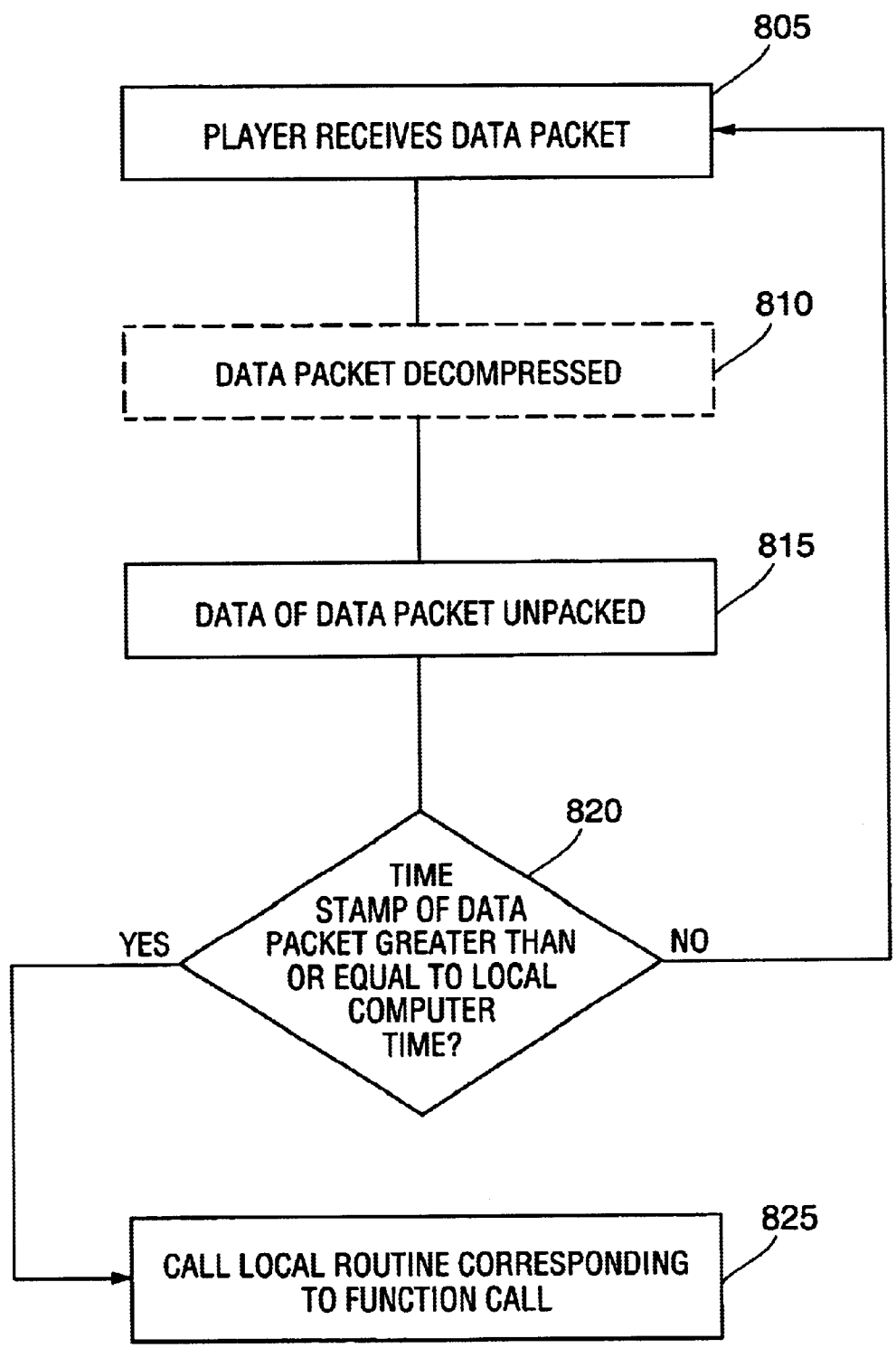
FIG. 8 is a flow chart which depicts a procedure followed by a client computer after receiving efficiently encoded graphic information according to another embodiment of the present invention.

An exemplary procedure followed by the player is illustrated in FIG. 8. In step 805, the player receives a data packet. In step 810, the data packet is decompressed. In step 815, the data in the data packet (e.g., time stamps, functions, parameters and multimedia data) are unpacked. In step 820, the time of the data packet's time stamp is compared with the time of the local computer. If the time of the time stamp is greater than or equal to the local time, the routine proceeds to step 825. There, a local routine is called which corresponds to the remote procedure call associated with the time stamp. If the local time is less than the time of the time stamp, the player continues with steps 805 through 820 until the local time equals or exceeds the time of the time stamp.

Figure 9:
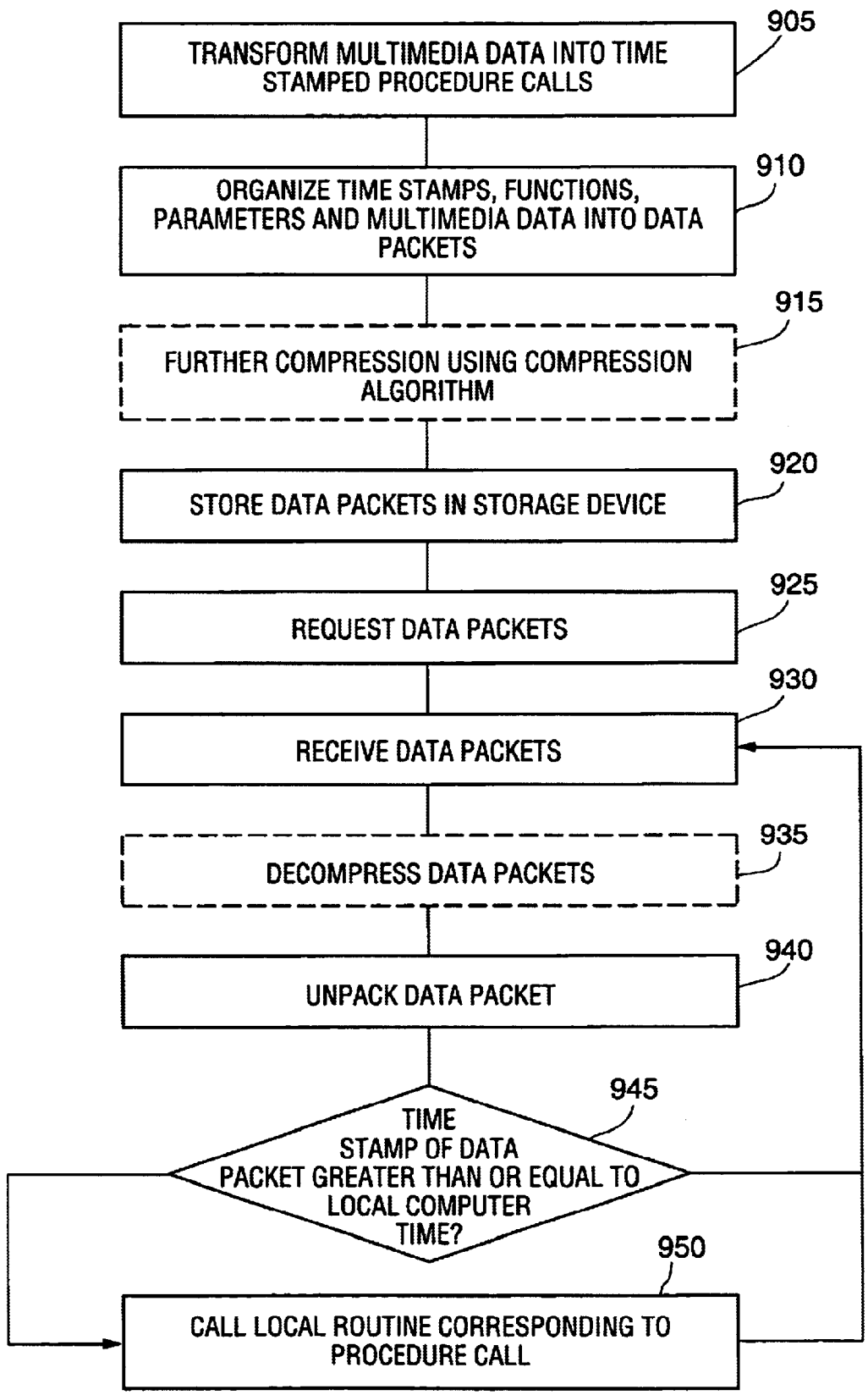
FIG. 9 is a flow chart which depicts a procedure for asynchronous streaming of multimedia data according to the present invention.

FIG. 9 illustrates an embodiment of an asynchronous method of encoding and decoding time-stamped data packets according to the present invention. In steps 905 and 910, time-stamped procedure calls are created by a first device and are organized into data packets. In some embodiments, the time stamps will correspond to a particular bandwidth of a communication link by which the data will be delivered, as discussed below.

In optional step 915, the data packets are compressed. In one embodiment, the time-stamped procedure calls are compressed using a dictionary method.

In step 920, the data packets are stored in a storage device. The first device may be a computer such as computer 735. The storage device could be any storage device associated with or in communication with the first device. For example, the storage medium could be hard drive 750, storage medium 726, another storage medium associated with server 727, or another storage device.

In some embodiments, the time stamps in the data packets will correspond to a particular bandwidth of a communication link between the storage device and a second device (such as handheld device 751 or 760, or computer 701) which will request the data packets. For example, the time stamps may be created assuming that the communication link between the storage device and the second device is a 56K connection, a cable connection, a T1 connection, a DSL connection, or some other type of communication link. In some embodiments, different sets of time-stamped procedure calls for the same multimedia data are created by the first device and stored in the storage device. In some such embodiments, the different data sets are organized by a look-up table or similar device so that data corresponding to a communication link associated with the second device may be readily accessed.

In step 925, the second device requests the data packets from the storage device. This request may be sent, for example, from computer 701 to server 727 via Internet 725. The request may be made, for example, at a time during which the first device is no longer turned on. In step 930, the data packets are transmitted from the storage device to the second device. For example, server 727 may execute a command which causes data stored in storage device 726 to be streamed via Internet 725 to computer 701.

In optional step 935, the second device decompresses the data packets and in step 940 the second device unpacks the time-stamped procedure calls. In step 945, the second device determines, for each streamed data packet, whether the associated time stamp is greater than or equal to the "local" time of the second device. If so, in step 950 the second device calls and executes a local routine corresponding to the procedure call, then receives subsequent data packets as described in step 930. If the local time is less than the time of the time stamp, the seconds device continues to receive and process subsequent data packets until the local time equals or exceeds the time of the time stamp, then calls and executes a local routine corresponding to the procedure call.

Some embodiments of the present invention include steps of returning information or requests from the second device to the storage device or the first device. For example, the second device could return information regarding the actual versus calculated transmission times, latency periods, data errors, or similar information.

While the best modes for practicing the invention have been described in detail, those of skill in the art will recognize that there are numerous alternative designs, embodiments, modifications and applied examples which are within the scope of the present invention. Accordingly, the scope of this invention is not limited to the previously described embodiments.

We claim:

1. A method of controlling a computer to reproduce multimedia data contained in a stream of data packets, comprising the steps of:

receiving the data packets;

de-marshalling the data packets into time stamps, instructions and multimedia data;

determining an execution time, based upon the time stamps, for each of the instructions, wherein said determining step comprises the steps of:

determining that a first data packet has a time stamp;

storing a first time corresponding to the time stamp of the first data packet in a memory;

determining that a second data packet has no time code; and assigning the first time to the second data packet; and reproducing the multimedia data on the computer by executing the instructions.

2. The method of claim 1, further comprising the step of decompressing the data packets.

3. The method of claim 1, wherein:

the stream of data packets comprises a first data packet and a second data packet;

the receiving step comprises receiving the first data packet at a first time and receiving the second data packet at a second time;

the reproducing step comprises reproducing multimedia data in the first data packet at a third time; and the third time is earlier than the second time.

4. The method of claim 1, wherein the executing step further comprises the steps of:

executing an instruction associated with the first data packet; and thereafter executing an instruction associated with the second data packet.

* * * * *